US012373718B2

(12) United States Patent
Pakhomchik et al.

(10) Patent No.: US 12,373,718 B2
(45) Date of Patent: Jul. 29, 2025

(54) HYBRID QUANTUM COMPUTATION ARCHITECTURE FOR SOLVING QUADRATIC UNCONSTRAINED BINARY OPTIMIZATION PROBLEMS

(71) Applicant: Terra Quantum AG, St. Gallen (CH)

(72) Inventors: Aleksei Pakhomchik, St. Gallen (CH); Mikhail Perelshtein, St. Gallen (CH)

(73) Assignee: Terra Quantum AG, St. Gallen (CH)

( * ) Notice: Subject to any disclaimer, the term of this patent is extended or adjusted under 35 U.S.C. 154(b) by 981 days.

(21) Appl. No.: 17/482,288

(22) Filed: Sep. 22, 2021

(65) Prior Publication Data

US 2022/0101167 A1 Mar. 31, 2022

(30) Foreign Application Priority Data

Sep. 29, 2020 (EP) .................................... 20199028

(51) Int. Cl.
*G06N 10/00* (2022.01)
*G06F 9/30* (2018.01)
*G06F 17/11* (2006.01)

(52) U.S. Cl.
CPC ......... *G06N 10/00* (2019.01); *G06F 9/30101* (2013.01); *G06F 17/11* (2013.01)

(58) Field of Classification Search
CPC ...................................................... G06N 10/00
USPC ....................................................... 716/136
See application file for complete search history.

(56) References Cited

U.S. PATENT DOCUMENTS

| 2019/0042392 | A1* | 2/2019 | Matsuura ............... G06N 10/70 |
| 2019/0164079 | A1 | 5/2019 | Gambetta et al. |
| 2021/0034998 | A1* | 2/2021 | Cao ........................ G06N 10/60 |

OTHER PUBLICATIONS

Japanese Patent Office, Office Action and Search Report in Japanese Patent Application No. 2021-151618, 3 pp. (Jan. 5, 2023).
(Continued)

*Primary Examiner* — Eric D Lee
(74) *Attorney, Agent, or Firm* — Leydig, Voit & Mayer, Ltd.

(57) ABSTRACT

A method for driving a quantum computational network for determining an extremal value of a cost function for solutions of a quadratic unconstrained binary optimization problem includes initializing qubits, sequentially applying layers of quantum gates to the qubits, determining an output state of the quantum computational network for obtaining a solution associated with the set of variational parameters $\vec{\theta}$, and determining an output state for shifted variational parameters $\vec{\theta}^*$ to evaluate a partial derivative with respect to the subset of the variational parameters $\vec{\theta}$ for determining a gradient of the cost function based on the output state for the shifted variational parameters $\vec{\theta}^*$, and by updating the variational parameters $\vec{\theta}$ based on an update function of a moving average over the gradient of the cost function and of a moving average over the squared gradient of the cost function.

20 Claims, 8 Drawing Sheets

(56) References Cited

OTHER PUBLICATIONS

Crooks, Gavin E. "Gradients of parameterized quantum gates using the parameter-shift rule and gate decomposition," arXiv:1905.13311 (2019).
Schuld et al. "Evaluating analytic gradients on quantum hardware," arXiv 1811.11184v1 (2018).
Mitarai et al., "Quantum circuit learning," *Physical Review A*, 98(3): 6 pp. (Sep. 10, 2018).
IP Australia, Office Action in Australian Patent Application No. 2021229219, 5 pp. (Sep. 11, 2023).
Benedetti et al., "Parameterized quantum circuits as machine learning models." *Quantum Science and Technology*, 4(4 ), 19 pp. (2019).
Ruder, "An overview of gradient descent optimization algorithms," *arXiv preprint*, arXiv:1609.04747, 14 pp. (2016).
Tabi et al., "Quantum optimization for the graph coloring problem with space-efficient embedding," *2020 IEEE International Conference on Quantum Computing and Engineering (QCE)*, IEEE, 7 pp. (2020).
Tan et al., "Qubit-efficient encoding schemes for binary optimisation problems," *Quantum*, 5, 14 pp. (2021).
European Patent Office, Extended European Search Report in European Patent Application No. 20199028.0, 17 pp. (Apr. 6, 2021).

* cited by examiner

HYBRID QUANTUM COMPUTATION ARCHITECTURE FOR SOLVING QUADRATIC UNCONSTRAINED BINARY OPTIMIZATION PROBLEMS

CROSS-REFERENCE TO RELATED APPLICATIONS

This patent application claims the benefit of European Patent Application No. 20199028.0, filed Sep. 29, 2020, which is fully incorporated herein by reference.

FIELD OF THE INVENTION

The present invention is in the field of quantum computation. More precisely, the present invention relates to a quantum computation architecture for finding solutions to discrete optimization problems.

BACKGROUND

Quantum computers provide a platform of controllable quantum mechanical systems whose state and interaction can be controlled in order to perform a computation. The computation is realized by a deterministic evolution of the controllable quantum mechanical systems, and the state of the quantum mechanical systems can be measured to determine the outcome of the computation.

The quantum computer generally encodes information in so called qubits, acting as a quantum mechanical equivalent of classical bits. Qubits are physical systems whose quantum mechanical state can be (coherently) controlled and (substantially) preserved between two basis states during the time of a computation, in the following referred to as $|0\rangle$ and $|1\rangle$. As an example, a qubit may be implemented by encoding information in the spin state of an electron, e.g. in the electron being in an "up" state or a "down" state, but may also be encoded in a polarization state of a photon, in states of a (superconducting) oscillator, in energy levels of an atom, or the like.

Control operations on these qubits are termed Quantum gates. Quantum gates can coherently act on qubits for inducing changes of the state of a single qubit (so called single-qubit gates) and for acting on multiple qubits (so called multi-qubit gates), e.g. to entangle the states of the multiple qubits, and any combination thereof. For example, a single-qubit gate may induce a rotation of the spin state of an electron by a selectable value, e.g. $\pi/2$. A multi-qubit gate may coherently act on two or more qubits, such as a coherent CNOT operation on the state of two qubits. A plurality of quantum gates can be applied to the qubits of the quantum computer in parallel or in sequence for performing a computation. Finally, the state of the qubits may be measured repeatedly after applying a sequence of quantum gates to determine the probabilities for each possible outcome of the computation.

In order to compute solutions to problems which are considered intractable on classical computers, a quantum computer can leverage the special properties of quantum mechanical states, in particular the superposition and entanglement of different quantum states, to find solutions with a comparatively low number of calculation steps.

However, the superposition/entangled states of quantum mechanical systems are inherently volatile (e.g. suffer from decoherence) and the control and measurement of these systems is subject to fidelity margins, such that state-of-the-art quantum computers are currently limited both in the number of controllable quantum mechanical systems (qubits) as well as the number of successively performed control actions (quantum gates).

Hence, clever exploitation of quantum mechanical properties is generally necessary to perform useful computations within the technical constraints of a low qubit number and a short sequence of successive computational operations.

Google AI Quantum and Collaborators: "Quantum Approximate Optimization of Non-Planar Graph Problems on a Planar Superconducting Processor", preprint quant-ph/2004.04197 on arxiv.org, show the implementation of a quantum approximate optimization algorithm for discrete binary optimization problems, such as the MaxCut problem of a graph of connected vertices. The quantum processor applies a sequence of layers of quantum gates to a qubit register, and the control parameters are iteratively optimized based on classical feedback from a quadratic fit of multiple evaluations of the computation.

Tan et al.: "Qubit-efficient encoding schemes for binary optimisation problems", preprint quant-ph/2007.01774 on arxiv.org teach an encoding scheme for solving quadratic unconstrained binary optimisation (QUBO) type problems with variational quantum algorithms, wherein the classical binary variables of the optimization problem are compressed into computational basis states of a qubit register, i.e., states spanned by the tensor product of the states of the qubit register. The solution to the QUBO problem may be probed by measuring the conditional probability of measuring a certain state of an ancilla qubit and one of the computational basis states. The solution is optimized with a classical optimizer, with the best performance obtained via the COBYLA algorithm.

Schuld et al.: *"Evaluating analytic gradients on quantum hardware", Physical Review A,* 99(3) teaches obtaining the decomposition coefficients ax and unitaries Ax for the evaluation of gradients of composite quantum gates by probing the outcome of an adjusted set of composite quantum gates to determine partial derivatives of the composite quantum gates with respect to single parameter gates in a series of unitary evolutions.

SUMMARY OF THE INVENTION

However, the known systems and methods are limited by the hardware architecture and are mostly applied to toy problems for which solutions can be found on classical computers in a shorter or a comparable timeframe. For example, the implementation of a quantum algorithm by Google AI Quantum and Collaborators is limited to problems on a graph of 23 vertices matching the hardware geometry, or less. The algorithm proposed by Tan et al. can exponentially cut the number of required qubits for solving QUBO problems, such that problems with an exponentially higher number of vertices can be tackled. However, the scaling of the algorithm does not reliably find optimal solutions as it has a tendency to get stuck in local minima, likely due to the use of improper classical optimization algorithms.

In view of this state-of-the-art, the object of the invention is to provide an efficient quantum algorithm for solving quadratic unconstrained binary optimization problems in polynomial time, with the potential for finding solutions to problems which are intractable on classical computers.

This object is solved by a method of driving a quantum computational network and a hybrid quantum computation system according to the independent claims. The dependent claims relate to preferred embodiments.

According to a first aspect, the invention relates to a method of driving a quantum computational network for determining an extremal value of a cost function for solutions of a quadratic unconstrained binary optimization (QUBO) problem. The quantum computational network comprises a plurality of qubits, including a plurality of register qubits and at least one ancilla qubit in a qubit register, and further comprises a plurality of layers of quantum gates acting on the qubits. The method comprises initializing the qubits, and sequentially applying the layers of quantum gates to the qubits, wherein each layer comprises multi-qubit quantum gates acting on a plurality of qubits and a plurality of variational quantum gates with two eigenvalues and variable actions onto the qubits, wherein the variable actions of the variational quantum gates of the layers of quantum gates form a set of variational parameters $\vec{\theta}$. The method further comprises determining an output state of the quantum computational network for obtaining a solution associated with the set of variational parameters $\vec{\theta}$, wherein each binary variable of the quadratic unconstrained binary optimization problem is associated with a computational basis state of the register qubits, and the solution is obtained by evaluating the probabilities of measuring the computational basis states corresponding to the binary variables. The solution is iteratively improved by sequentially applying the layers of quantum gates with shifted variational parameters $\vec{\theta}^*$, the shifted variational parameters $\vec{\theta}^*$ comprising a subset of the variational parameters $\vec{\theta}$ shifted by a shift, determining the output state for the shifted variational parameters $\vec{\theta}^*$ to evaluate a partial derivative with respect to the subset of the variational parameters $\vec{\theta}$, determining a gradient of the cost function based on the output state for the shifted variational parameters $\vec{\theta}^*$, and updating the variational parameters $\vec{\theta}$ based on an update function of a moving average over the gradient of the cost function and of a moving average over the squared gradient of the cost function.

The method of driving the quantum computational network can determine a solution to the QUBO problem with a heuristic method similar to the operation of a neural network. The variational parameters $\vec{\theta}$ can encode an initial (random) guess, and the outcome of the evaluation of the quantum computational network with the variational parameters $\vec{\theta}$ can be measured to determine a corresponding solution. Based on the solution, a cost function of the QUBO problem may be classically evaluated to attribute a cost to the solution, or in other words, a measure is calculated of how good the solution is. By iteratively improving the solution through updating the variational parameters $\vec{\theta}$, in a manner which may be similar to a gradient descent for a neural network, the quantum computational network progressively approaches an optimized solution.

Contrary to the prior art, the quantum computational network is optimized by determining the partial derivative of the quantum computational network with respect to the variational parameters $\vec{\theta}$ based on a direct measurement of the quantum computational network. On the basis of the partial derivatives of the quantum computational network, a gradient of the cost function is determined through classical computation, in the following referred to as measured gradient of the quantum computational network. However, in contrast to gradient methods in classical deep (neural) networks, gradient descent in quantum networks without some additional strategy cannot provide stable performance.

According to the invention, the variational parameters $\vec{\theta}$ are updated based on an update function of a moving average over the gradient of the cost function and of a moving average over the squared gradient of the cost function, in the following referred to as adaptive moment based update function. The inventors found that the adaptive moment based update function enables the gradient descent based on the measured gradient of the quantum computational network and significantly improves the gradient descent towards an optimal solution.

In fact, the update based on the adaptive moment based update function was found by the inventors to compete with and even outperform approaches based on (gradient free) classical optimizers as the one used in Tan et al. Surprisingly, the update function based on the measured gradient of the quantum computational network can be effective also in the case where the solution, and therefore also the problem, is compressed into the computational basis states of the qubits, allowing to exponentially reduce the number of qubits.

In other words, by combining an encoding of the solution into the computational basis states of the qubits, an evaluation of the measured gradient of the quantum computational network, and the adaptive moment based update function, an advantageous quantum architecture is designed which balances out the shortcomings of the prior art, such that the computation may be performed with comparatively low qubit number while still efficiently finding solutions to complex problems in polynomial time. The method may therefore define a hybrid computation architecture, wherein function evaluations as well as gradient estimation can be computed on quantum hardware while a relationship between measured values and the problem may be determined on classical hardware.

The skilled person will appreciate that the term "quantum computational network" should not be understood to be limited to a linked (physical) network, but may rather refer to the action of a plurality of quantum gates (organized into layers) on the qubits in a sequence and/or in parallel to link the states of the qubits via multi-qubit operations. In other words, the network may be established through a concatenation of quantum gates acting on the qubit register and links in the network may arise due to multi-qubit gates entangling multiple qubits.

To evaluate the quantum computational network, the qubits can be initialized into an initial state, such as the ground state of each qubit. In some embodiments, after initialization of the qubits into their ground states, superposition states of each qubit in the qubit register are prepared, e.g. via the application of Hadamard gates.

The layers of quantum gates may then act on the qubits to link the qubits in the quantum computational network, with the action of the (variational) quantum computational network being parametrized by the variational parameters $\vec{\theta}$. A layer of quantum gates may comprise a cumulative action of a plurality of coherent operations on the state of the qubits in the qubit register. The cumulative action of the coherent operations in one layer should generally act on all qubits of the qubit register which are involved in the computation, or in other words, a layer of quantum gates should directly affect the state of all qubits in the qubit register. Each layer should comprise at least one multi-qubit gate and at least one variational quantum gate (which in principle could be the same gates). Preferably, both the multi-qubit gates an dteh variational gates of a layer directly act on the state of all qubits of the qubit register. At the same time, the layer may be temporally or structurally constricted, e.g. a layer in a sequence of coherent operations may be defined by the shortest sequence of quantum gates which fulfills the criteria of acting on the majority or all qubits of the qubit register used in the computation and including at least one variational quantum gate, preferably a number of variational quantum gates substantially corresponding to the number of qubits in the qubit register, or multiples thereof. The skilled person will appreciate that a plurality of the quantum gates in a layer may be applied in parallel to the qubits to shorten the sequence of coherent operations on the state of the qubits in a layer. The subsequent application of a plurality of layers of quantum gates to the qubits may then form the quantum computational network.

In preferred embodiments, the layers of quantum gates comprise the same arrangement of quantum gates in each layer and wherein the quantum gates in each layer in particular comprise a plurality of multi-qubit quantum gates which together act on all qubits of the qubit register.

The layers may contain the same or different types of quantum gates and may be applied sequentially to the qubit register. For example, each layer may feature the same architecture of quantum gates while different elements of the variational parameters $\vec{\theta}$ may apply to the variational gates of the layer. In other words, the layers may feature the same quantum gate architecture, but the action of the quantum gates on the qubits in each layer may differ based on the variational parameters $\vec{\theta}$.

In preferred embodiments, each layer of quantum gates comprises a set of variational quantum gates acting on each qubit of the qubit register, wherein the set of variational quantum gates is in particular a set of variational single qubit gates.

By applying a variational quantum gate to each qubit of the qubit register in each layer, the number of layers for converging towards a solution may be reduced, such that the quantum computation architecture may be performed with a shorter sequence of quantum gates and may be less sensitive to noise.

In preferred embodiments, the number of variational quantum gates in each layer is substantially equal to the number of qubits in the qubit register.

The inventors found that by limiting the number and/or types of variational gates the complexity of the cost function landscape may be constrained to enable convergence towards an optimized solution. In some embodiments, an advantageous compromise may be found by providing a set of variational quantum gates acting on each qubit of the qubit register in each layer of quantum gates while the number of variational quantum gates in each layer is substantially equal to the number of qubits in the qubit register.

After the layers of quantum gates have acted on the qubits, the qubits can be measured to obtain a characteristic outcome of the quantum computational network with respect to the known initial state. The outcome of the quantum mechanical computation may be linked to the classical solutions of the problem via the computational basis states of the qubits. The computational basis states may be orthogonal basis states of the Hilbert space spanned by the tensor product of the basis states of each qubit.

In preferred embodiments, the computational basis state of the register qubits is a tensor product of the computational basis of a plurality of the register qubits, in particular a tensor product of the computational basis of all register qubits.

For example, if two qubits each have basis states |0> and |1>, the computational basis states may be |00>, |01>, |0> and |11>, and each of the computational basis states may be associated to one classical binary variable. Hence, $N_c$ classical variables may be represented by the computational basis states of a qubit register with a number of $N_q = \log(N_c)$ register qubits.

In preferred embodiments, the qubits of the quantum computational network are arranged into $\log(N_c)$ register qubits and a number of $N_a$ ancilla qubits for solving a quadratic unconstrained binary optimization problem with $N_c$ classical binary variables.

For example, the classical variables may be encoded into of $N_q = \log(N_c)$ register qubits and one ancilla qubit for a minimal encoding sufficient for solving MaxCut problems on complete graphs, e.g. the state of the qubit register after the evaluation of the quantum computational network with variational parameters $\vec{\theta}$ may be given by:

$$|\psi(\vec{\theta})\rangle = \sum_{i=0}^{n_c} \beta_i \left( a_i(\vec{\theta})|0\rangle + b_i(\vec{\theta})|1\rangle \right) \otimes |i\rangle$$

with the computational basis states |i> of the register qubits being associated to a classical variable and the amplitude $b_i$ (or $a_i$) encoding the state of the classical variable. For example, by measuring $|b_i(\vec{\theta})\rangle|^2$ for each computational basis state, one may determine the classical solution to the QUBO problem corresponding to the variational parameters $\vec{\theta}$.

In some embodiments, the qubits of the quantum computational network may feature at least two ancilla qubits to increase the order of correlations between classical variables captured and therefore to extend the type of problems solvable by the quantum computation architecture to different types of QUBO problems. The general encoding scheme for encoding QUBO type problems with more than one ancilla qubit has been proposed by Tan et al. ("Qubit-efficient encoding schemes for binary optimisation problems", preprint on arxiv.org) in the Chapter IV "TWO-BODY CORRELATIONS", and the corresponding teaching regarding the encoding is incorporated herein by reference.

In preferred embodiments, the solution is obtained by evaluating the conditional probabilities of measuring an ancilla state of the at least one ancilla qubit and of measuring one of the computational basis states of the register qubits corresponding to the binary variable.

A measurement of the ancilla and register qubits may project the complex quantum mechanical state of the register qubits onto the computational basis, such that one of the computational basis states is measured as an outcome. Repeating the measurement may allow finding the (conditional) probabilities of each outcome of the computation for the variational parameters $\vec{\theta}$. For example, for each quantum computational network (parametrized by the variational parameters $\vec{\theta}$) the $N_q$ qubits of the qubit register may be measured $\approx 2^{N_q}$ times to approximate the outcome state.

The cost function may attribute a cost to the solution (measurement outcome) obtained by the quantum computational network according to the cost function of the QUBO problem.

For example, the cost function may be a MaxCut problem on an arbitrary graph, i.e. the problem of finding the cut through a set of connected nodes, such that the total weights of edges between the two separated sets is as large as possible. This problem can be mapped to several equivalent problems, such as the optimization of a chip layout in VLSI circuit design, and finding the correct solution is therefore of technical importance. The MaxCut problem may be parametrized as the QUBO problem of minimizing the cost function $$E = \sum_{i,j=1}^{n_c} d_{ij}(x_i - x_j)^2,$$

where $d_{ij}$ is the weight of an edge between ith and jth nodes in a graph. The solution is a binary string $\vec{x}$ of nodes that show the correspondence to one of two sets. The elements of the corresponding QUBO matrix, in turn, may be $Q_{ij}=2\,d_{ij}$ (i>j) and $Q_{ii}=-\Sigma_j d_{ij}$. Hence, after determining the probabilities of the outcome states of the quantum computational network, the cost may be calculated according to the respective cost function.

Generally, the method according to the first aspect with one ancilla qubit can be capable of solving QUBO problems with the cost function $$E = \sum_m f_m(\vec{x}),$$

where $f_m(\vec{x}): [0, 1]^n \to \mathbb{R}$ is a quadratic function that has the property: if $f_m(\vec{x})=\min$, then $f_m([\vec{x}])=\min$, where $[\vec{x}]$ is an integer rounding. However, by increasing the number of $\vec{x}$ ancilla qubits, the method can be applied to solve more general QUBO problems with increased correlations between variables.

The cost function may then be minimized by iteratively improving the solution according to the measured gradient of the quantum computational network. Specifically, the quantum mechanical network can be evaluated repeatedly to determine the partial derivatives of the layers of quantum gates with respect to the variational parameters, and the gradient may be classically computed from the measured partial derivatives. The variational parameters may then be updated with the adaptive moment based update function. As the adaptive moment based update function depends on the moving average over the gradient of the cost function and the (element) square of the moving average over the gradient of the cost function, the update of the variational parameters may be smoothed by first order and second order moments of the gradient, enabling the descent towards an optimized solution.

In preferred embodiments, the update function is substantially proportional to the moving average over the gradient of the cost function and substantially inversely proportional to the square root of the moving average over the squared gradient of the cost function, wherein the moving average over the gradient of the cost function and of a moving average over the squared gradient of the cost function are in particular exponentially decaying moving averages.

For example, the update function may be substantially proportional to the normalized moving average over the gradient of the cost function, which is normalized by the absolute value of the moving average of the gradient of the cost function.

In preferred embodiments, the update function at an iterative step t is mathematically equivalent to:

$$\vec{\theta}_{t+1} = \vec{\theta}_t - \frac{\alpha}{\sqrt{v_t} + \epsilon} m_t$$

with $m_t$ being proportional to the moving average over the gradient of the cost function and $v_t$ being proportional to the moving average over the squared gradient of the cost function, $\alpha$ being a learning rate hyperparameter, and $\epsilon$ being a small number with respect to the expected magnitude of the update.

For example, $\epsilon$ may be $10^{-8}$, and $\alpha$ may be 0.01, such that $\epsilon$ is smaller than the expected magnitude of the update by a factor of $10^6$.

In preferred embodiments, $$m_t = \frac{\beta_1 m_{t-1} + (1-\beta_1)\nabla C|_{\vec{\theta}=\vec{\theta}_t}}{1-\beta_1^t}$$

and $$v_t = \frac{\beta_2 v_{t-1} + (1-\beta_2)\left(\nabla C|_{\vec{\theta}=\vec{\theta}_t}\right)^2}{1-\beta_2^t},$$

with $\beta_1$ and $\beta_2$ being real values between 0 and 1, $\nabla C|_{\vec{\theta}=\vec{\theta}_t}$ being the gradient determined at iterative step t based on the output state for the shifted variational parameters $\vec{74}\,*$, and $(\nabla C|_{\vec{\theta}=\vec{\theta}_t})^2$ being the element square of the gradient determined at iterative step t, while $m_{t-1}$ and $v_{t-1}$ are the previously determined values of $m_t$ and $v_t$ at time step t−1, respectively, and $m_0$ and $v_0$ are zero.

The quotients $1-\beta_1^t$ and $1-\beta_2^t$ may be understood as bias correction terms for correcting an initialization bias of the initial values of $m_t$ and $v_t$ being initialized to zero (i.e. at t=0), such that $m_t$ and $v_t$ may be exponentially decaying moving averages of the gradient/square of the gradient of the cost function, respectively, with the rate of decay being given by $\beta_1$ and $\beta_2$. For example, $\beta_1$ and $\beta_2$ may be selected as 0.9 and 0.999, respectively.

The inventors found that the adaptive moment based update function significantly improves the performance of the quantum computational network as compared to other gradient descent algorithms. It is believed that the update function advantageously acts upon the gradient component by using the exponential moving average of gradients $m_t$ to overcome the noise in the quantum system, while at the same time advantageously acting on the learning rate component by dividing the learning rate $\alpha$ by the exponential moving average of squared gradients $v_t$ to optimize the update magnitude in view of the landscape of the cost function imposed onto the variational quantum computational network.

The efficiency of the gradient descent may also depend on the accuracy of the gradient. While it may in principle be possible to evaluate the partial derivatives of the quantum computational network only with respect to a portion of the variational parameters $\vec{\theta}$/variational gates, it may therefore be advantageous to evaluate the partial derivatives of the quantum computational network for each variational parameter of the variational parameters $\vec{\theta}$ individually, for each step of optimizing the variational parameters $\vec{\theta}$.

In preferred embodiments, the method comprises sequentially applying the layers of quantum gates with shifted variational parameters $\vec{\theta}*$ twice for each variational gate, the shifted variational parameters $\vec{\theta}*$ comprising a subset of the variational parameters $\vec{\theta}$ shifted by symmetric shifts for each variational gate, to evaluate a partial derivative with respect to each variable action of the variational parameters $\vec{\theta}$ for determining the gradient before updating the variational parameters $\vec{\theta}$.

The subset of the variational parameters $\vec{\theta}$ may be a single variational parameter, i.e. the partial derivatives may be determined with respect to each variational gate, or may be a plurality of the variational parameters $\vec{\theta}$. The symmetric shifts should depend on the eigenvalues of the variational quantum gate(s). Generally, the partial derivative may be estimated by shifting the gate by the shift $$s = \frac{\pi}{4r}$$

with r being the eigenvalues of the variational quantum gate. The partial derivative of the outcome f of applying the quantum computational network to the initial state of the qubit register with respect to the variational quantum gates with variational parameter $\theta_j$ may then be evaluated according to $\partial_{\theta_j} f = r(f(\theta_j+s)-f(\theta_j-s))$. Hence, the partial derivatives of the quantum computational network may be calculated directly by evaluating the outcome of the same quantum computational network architecture as the one used for determining a solution, such that the architecture of the quantum computational network may be simplified.

In preferred embodiments, the two eigenvalues of the variational quantum gates are $\pm\frac{1}{2}$ and the shift is $\pm\pi/2$.

For single-qubit gates with the eigenvalues $\pm/2$, e.g. one-qubit rotation generators in $\frac{1}{2}\{\sigma_x, \sigma_y, \sigma_z\}$, the shift should be $\pm\pi\frac{1}{2}$. Single qubit rotations are native to most implementations of quantum computers, have two eigenvalues, and often feature higher fidelity than multi-qubit gates. Hence, with the variational gates being single-qubit rotations, the partial derivatives may be determined with higher accuracy than for the case of variational multi-qubit gates.

For each step of "gradient descent" towards the optimal solution the quantum computational network may be evaluated $2*T*2^{N_q}$ times, i.e. twice for each variational parameter T and $2^{N_q}$ times in order to estimate the outcome of each evaluation in the computational basis of the $N_q$ qubits. Since $N_c$ classical variables may be compressed into a number of $N_q=\log(N_c)$ qubits, the number of evaluations may only scale polynomially with the number of classical variables. Accordingly, an efficient quantum computation architecture for solving QUBO problems may be provided.

According to a second aspect, the invention relates to a method of driving a quantum computational network for determining an extremal value of a cost function for solutions of a quadratic unconstrained binary optimization problem. The quantum computational network comprises a plurality of qubits and further comprises a plurality of layers of quantum gates acting on the qubits. The method comprises initializing the qubits, and sequentially applying the layers of quantum gates to the qubits, wherein each layer comprises multi-qubit quantum gates entangling a plurality of qubits and a plurality of variational quantum gates G with variable actions onto the qubits, wherein the variable actions $\theta_j$ of the variational quantum gates of the layers of quantum gates form a set of variational parameters $\vec{\theta}$. The method further comprises determining an output state of the quantum computational network for obtaining a solution associated with the set of variational parameters $\vec{\theta}$, wherein each binary variable of the quadratic unconstrained binary optimization problem is associated with a computational basis state of the register qubits, and the solution is obtained by evaluating the conditional probabilities of measuring the computational basis states corresponding to the binary variables. The solution is iteratively improved by applying the layers of quantum gates and additional quantum gates $A_k$ conditionally applied based on the state of an ancilla qubit, the additional quantum gates fulfilling the equation $\partial_{\theta_j} G = \Sigma_{k=1}^{K} \alpha_k A^k$, with K being a real positive value, and determining the output state to evaluate a partial derivative of the layers of quantum gates with respect to the variable action $\theta_j$ of the variational parameters $\vec{\theta}$, determining a gradient of the cost function based on the partial derivative of the layers of quantum gates, and updating the variational parameters $\vec{\theta}$ based on an update function of a moving average over the gradient of the cost function and of a moving average over the squared gradient of the cost function.

In general, the variational gates need not have only two eigenvalues. Instead, the variational gates may also feature more than two eigenvalues. The partial derivative of the quantum computational network may then still be obtained by evaluating the quantum computational network by adding an ancilla qubit and performing an adjusted quantum computation which features the additional quantum gates $A_k$ acting on the qubit register conditionally on the state of the ancilla qubit. A Hadamard gate may bring the ancilla qubit into a superposition state and the variational quantum gate G or the additional quantum gates $A_k$ may act on the qubits depending on the state of the ancilla. The outcome of the quantum computation and the state of the ancilla may then be measured to obtain the expectation values $E_0$ and $E_1$ for the state of the ancilla being $|0\rangle$ and $|1\rangle$, respectively, with probabilities $p_0$ and $p_1$ for each of the additional quantum gates $A_k$. The partial derivative may then be determined according to $\partial_{\theta_j} f = \Sigma_{k=1}^{K} \alpha_k 2(p_0 E_0 - p_1 E_1)|_k$.

According to a third aspect, the invention relates to a hybrid quantum computation system for determining an extremal value of a cost function for solutions of a quadratic unconstrained binary optimization problem. The system comprises a quantum computational network comprising a qubit register comprising a plurality of qubits, a plurality of quantum gates, and a controller. The plurality of quantum gates selectively act on the qubits of the qubit register and include multi-quantum gates acting on multiple qubits of the qubit register and a plurality of variational quantum gates with respective variable actions onto the qubits of the qubit register, wherein the variable actions form a set of variational parameters $\vec{\theta}$. The controller is configured to initialize the qubits of the qubit register, and apply the quantum gates to the qubit register in a sequence of layers with the variational parameters $\vec{\theta}$, wherein each layer comprises variational quantum gates for determining an output state. The controller is further configured to apply the sequence with shifted variational parameters $\vec{\theta}*$, the shifted variational parameters $\vec{\theta}*$ comprising a subset of the variational parameters $\vec{\theta}$ shifted by a shift and determine the associated output state for the shifted variational parameters $\vec{\theta}*$ and determining the output state for the shifted variational parameters $\vec{\theta}*$ to evaluate a partial derivative with respect to the subset of the variational parameters $\vec{\theta}$, and/or to conditionally apply the layers of quantum gates and additional quantum gates $A_k$ based on the state of an ancilla qubit, the additional quantum gates fulfilling the equation $\partial_{\theta_j} G = \Sigma_{k=1}^{K} \alpha_k A_k$, with K being a real positive value, and determine the output state to evaluate a partial derivative of the layers of quantum gates with respect to the variable action $\theta_j$ of the variational parameters $\vec{\theta}$. The controller is further configured to determine a gradient of a cost function based on the partial derivative, wherein the cost function associates a cost to a solution encoded in the output state, wherein each binary variable of the quadratic unconstrained binary optimization problem is associated with a computational basis state of the qubits, and the solution is obtained by evaluating the conditional probabilities of measuring the computational basis states corresponding to the binary variables, and to update the variational parameters $\vec{\theta}$ based on an update function of a moving average over the gradient of the cost function and of a moving average over the squared gradient of the cost function.

According to a fourth aspect, the invention relates to a computer program or computer program product comprising machine readable instructions, which when the computer program is executed by a processing unit cause the processing unit to implement a method according to the first and/or the second aspect and/or to implement and/or to control a system according to the third aspect.

DETAILED DESCRIPTION OF EMBODIMENTS

The features and numerous advantages of the method and hybrid quantum computation system according to the present invention will best be understood from a detailed description of preferred embodiments with reference to the accompanying drawings, in which:

FIG. 1 schematically illustrates an example of a hybrid quantum computation system;

Figure 1:
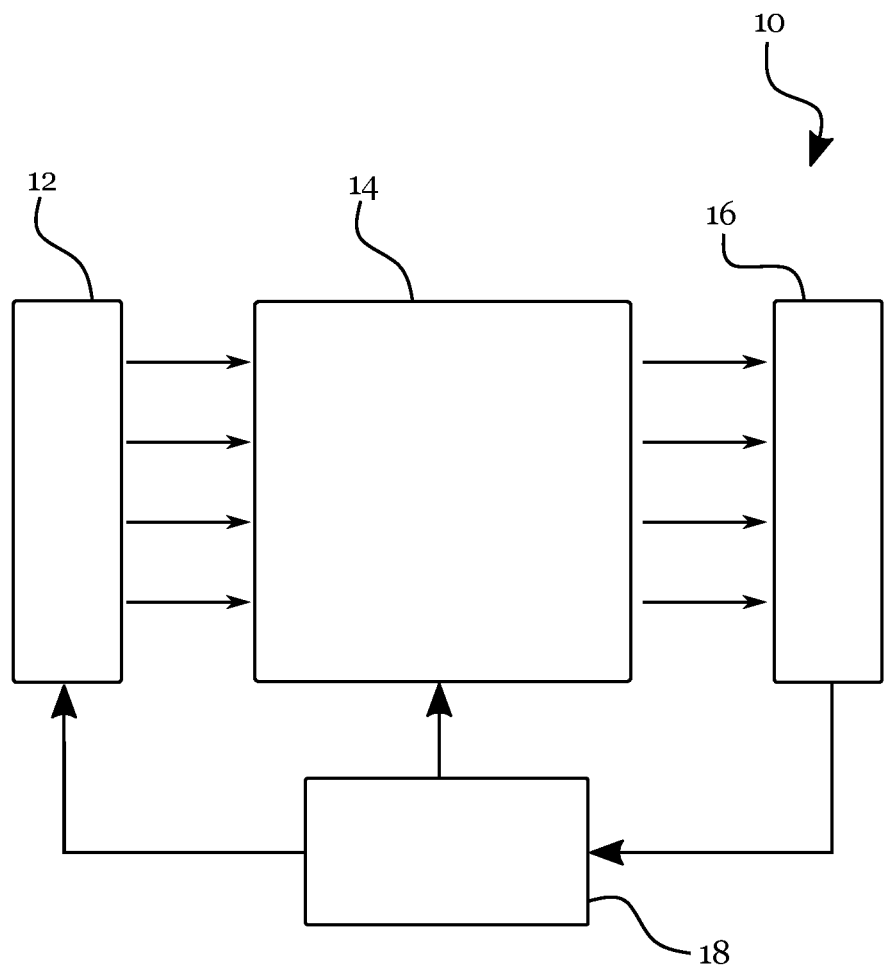

FIG. 1 schematically illustrates an example of a hybrid quantum computation system 10 for implementing and driving a quantum computational network. The system 10 comprises a qubit register 12 comprising a plurality of qubits. A plurality of quantum gates 14 may act on the qubits of the qubit register 12 to perform a computation. The outcome of the computation may be measured by a measurement sensor 16 which projects the states of the qubits onto the computational basis states of the hybrid quantum computation system 10. The outcome can be received by a controller 18.

The controller 18 may be configured to repeatedly perform a computation sequence. The computation sequence may comprise initializing the qubits of the qubit register 12 before each computation, such as into the ground state of each qubit, e.g. to form an initial state of the qubits of $|00\ldots 0\rangle$. The controller 18 may then apply the plurality of quantum gates 14 to the qubits of the qubit register 12 to drive a coherent evolution of the qubits. Initially, the controller may produce superposition states of all qubits, e.g. by applying a Hadamard gate to each of the qubits, and may subsequently apply the plurality of quantum gates 14 including variational quantum gates with variable actions. Following the coherent evolution, the state of the qubits in the qubit register 12 may be measured with the sensor 16. On the basis of the measured result, the controller 18 can classically calculate an "energy"/"cost" of the solution with a cost function of the QUBO problem to be solved.

The controller 18 may then repeat the computation sequence with adjusted variable actions based on the outcome, such as to progressively improve the solution to a QUBO type problem associated with the measured outcome. Specifically, the controller 18 may repeat the computation sequence with adjusted operation parameters for the variational quantum gates in order to determine a gradient of the plurality of quantum gates 14 from the measured outcomes and may update the variable actions based on the estimated gradient in order to progressively adjust the quantum computational network towards an improved solution.

The plurality of quantum gates 14 may be arranged into layers of similar or identical structure, and the controller 18 may subsequently apply the layers of quantum gates with their respective variational parameters. Preferably, each layer comprises multi-qubit gates for entangling a plurality or all of the states of the qubits, and variational quantum gates affecting the state of all qubits.

Figure 2:
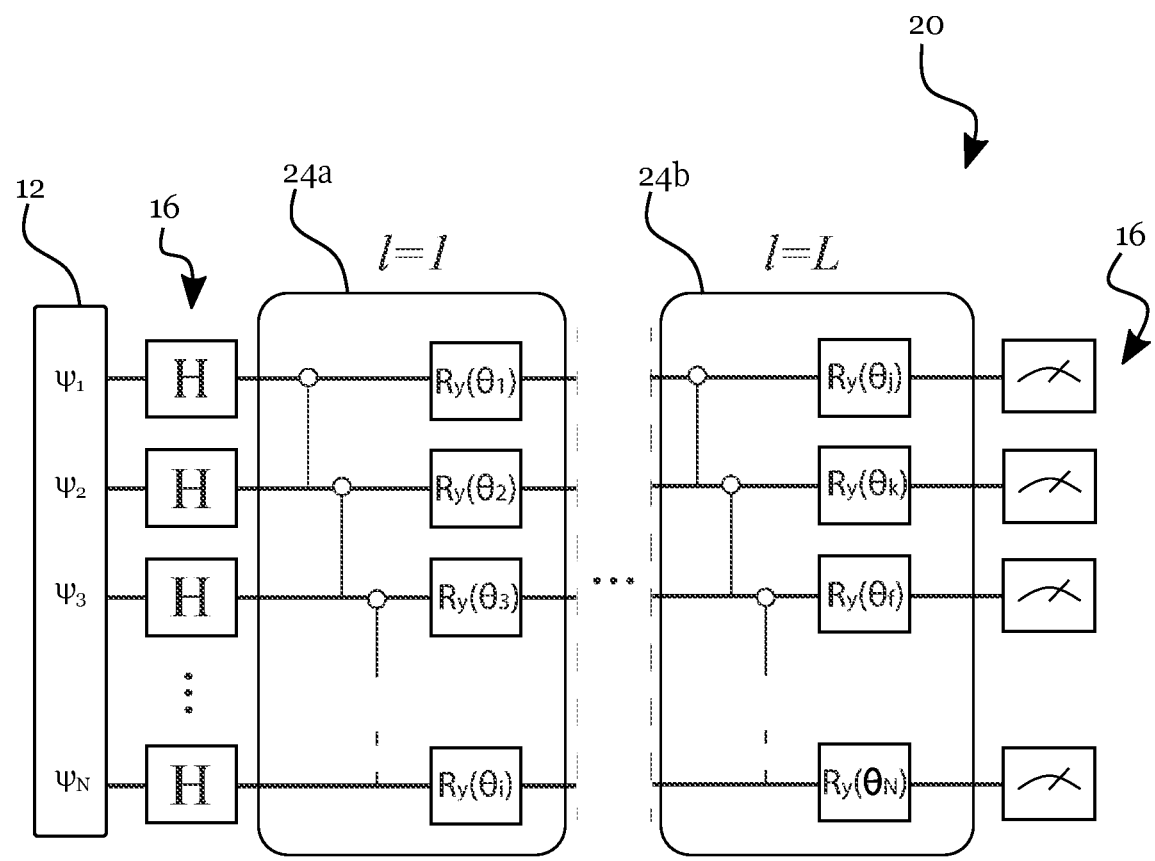
FIG. 2 illustrates an example of a quantum computational network 20 with a plurality of quantum gates.

FIG. 2 illustrates an example of a quantum computational network 20 with a plurality of quantum gates 14. The quantum computational network 20 comprises a qubit register 12 including a plurality of qubits with states $\Psi_1$-$\Psi_N$, and the evolution of each qubit state is illustrated as horizontal lines extending horizontally from the qubit register 12 towards the measurement sensors 16.

The qubits may be initially initialized into their ground states, e.g. $|0\rangle$. The plurality of quantum gates 14 may comprise a plurality of Hadamard (H) gates 22 acting on each qubit of the qubit register 12 after the qubits have been initialized to prepare each qubit in a superposition state. The quantum computational network 20 may then comprise a plurality of L layers 24a, 24b of quantum gates with equal structure, wherein the layers represent a plurality of quantum operations on the qubits in the qubit register 12, which are subsequently applied.

Each layer 24a, 24b comprises a plurality of multi-qubit gates, e.g. CNOT gates (depicted as vertical lines and hollow circles on the respective horizontal line of the "control qubit"). Further, in each layer 24a, 24b variational single qubit gates drive single qubit rotations $R_y(\theta)$ of each qubit around axis y with variable angles $\theta_i$. The variational angles $\theta_1$-$\theta_N$ across all layers 24a, 24b form a set of variational parameters $\vec{\theta}$ of the quantum computational network 20. The quantum computational network 20 depicted in FIG. 2 with L layers 24a, 24b and N qubits features L*N variable actions (angles) as variational parameters of $\vec{\theta}$, wherein each layer 24a, 24b comprises a plurality of two-qubit gates acting on all pairs of neighboring qubits of the qubit register 12 and the variable actions may drive variable single qubit rotations of each qubit in each layer 24a, 24b.

The skilled person will appreciate, that the arrangement of gates in FIG. 2 is for illustrative purposes only and suitable geometries of the quantum computational network 20 may differ from the depicted representation. For example, in FIG. 2, the CNOT gates acting on neighboring pairs of qubits act on the qubits in a (temporal) sequence. However, in preferred embodiments, a plurality of multi-qubit gates may be applied to the qubits in parallel, e.g. in two sequential applications of two-qubit gates acting on odd/even numbered pairs of neighboring qubits in parallel.

Following the application of the layers 24a, 24b of quantum gates onto the qubits, the state of the qubits may be measured by the measurement sensors 16. The measurement sensors 16 may be a plurality of single qubit state detectors for measuring the state of each qubit following the evolution according to the plurality of quantum gates 14. Repeating the measurement may allow determining the probability of each measurement outcome and the result may be employed for finding a solution to the QUBO problem.

Figure 3:
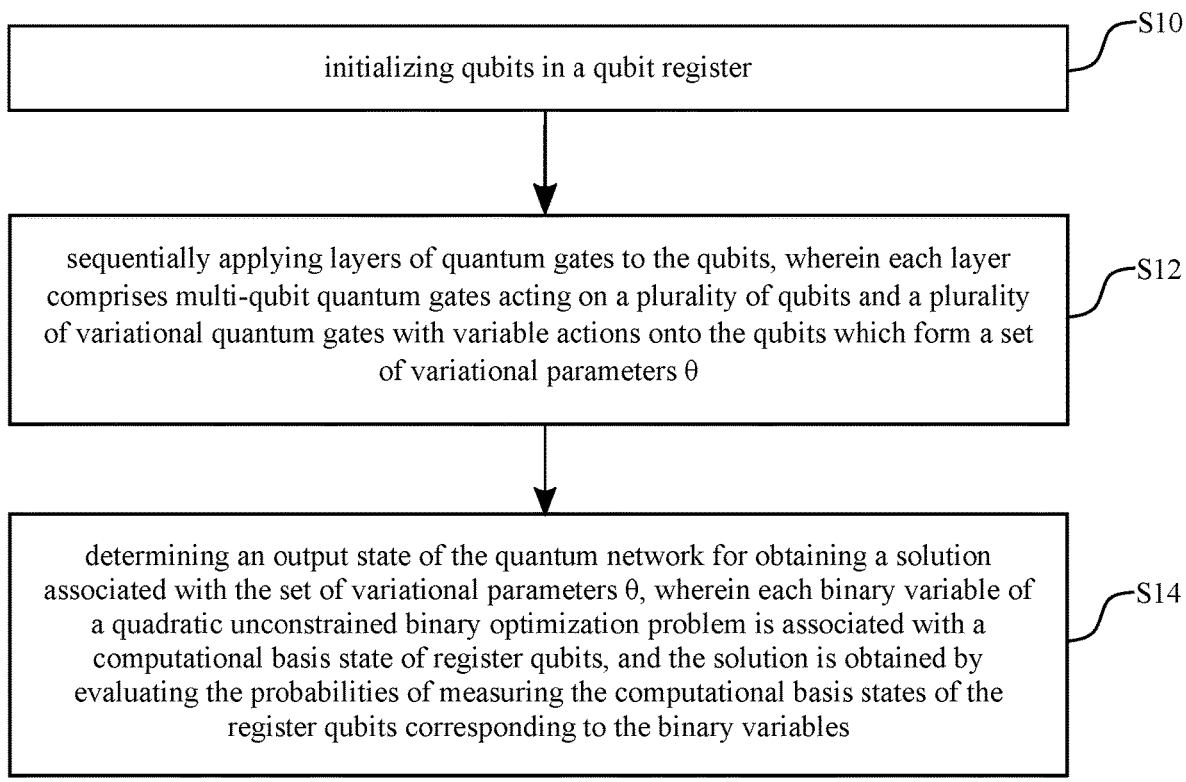
FIG. 3 illustrates an example of a flow diagram of a method for obtaining a solution to a QUBO problem.

FIG. 3 illustrates an example of a flow diagram of a method for obtaining a solution to a QUBO problem. The method comprises initializing qubits in a qubit register 12 (Si), and sequentially applying layers 24a, 24b of quantum gates to the qubits, wherein each layer 24a, 24b comprises multi-qubit quantum gates acting on a plurality of qubits and a plurality of variational quantum gates with variable actions onto the qubits which form a set of variational parameters $\vec{\theta}$ (S12). The method further comprises determining an output state of the quantum computational network 20 for obtaining a solution associated with the set of variational parameters $\vec{\theta}$, wherein each binary variable of a quadratic unconstrained binary optimization problem is associated with a computational basis state of register qubits, and the solution is obtained by evaluating the probabilities of measuring the computational basis states of the register qubits corresponding to the binary variables (S14).

The variational parameters $\vec{\theta}$ may be variational angles $\theta_i$ of single qubit rotations $R_y(\theta_i)$ as illustrated in FIG. 2 or other variational parameters of the variational quantum gates parametrized by respective variational parameters $\theta_i$ of $\vec{\theta}$. The output state may then be the state of each qubit in the computational basis. For example, for two register qubits having basis states $|0\rangle$ and $|1\rangle$, the computational basis states of the register qubits may be $|00\rangle$, $|01\rangle$, $|10\rangle$ and $|11\rangle$, and each of the computational basis states may be associated to one classical binary variable. Accordingly, the method may be suitable to find solutions to a (discrete) binary optimization problem with 4 variables when the qubit register comprises two register qubits, and generally for a problem with $2^{N_q}$ variables for a number of $N_q$ qubits.

The relationship between the encoded variables and the solution may be obtained by measuring the conditional probabilities of measuring a certain register state of the register qubits and the state of at least one ancilla qubit. For example, for one ancilla qubit and a minimal encoding of the classical variables into the quantum register, the final state may be given by $$|\psi(\vec{\theta})\rangle = \sum_{i=0}^{n_c} \beta_i \left(a_i(\vec{\theta})|0\rangle + b_i(\vec{\theta})|1\rangle\right) \otimes |i\rangle$$

where the first state in the sum is the state of an ancillary qubit and the state $|i\rangle$ corresponds to the computational basis states of the register qubits. The sampling of this state gives components of a classical solution $Pr(x_i=1)=|b_i(\vec{\beta})|^2$. This probability can be related to the cost function of the QUBO problem via the QUBO matrix Q characteristic to the problem via evaluating $$C = \sum_{i \neq j} Q_{ij} |b_i(\vec{\theta})|^2 |b_j(\vec{\theta})|^2 + \sum_i^{n_c} Q_{ii} |b_i(\vec{\theta})|^2$$

on a classical computer. Accordingly, the measurement of the states of the qubits in the qubit register 12 after applying the layers 24a, 24b of quantum gates may be used to obtain (initially random) solutions to the QUBO problem.

The quantum computational network 20, i.e. the variational parameters $\vec{\theta}$ parametrizing the action of the quantum computational network 20 onto the qubits, may then be optimized in a feedback loop with the goal of minimizing the cost of the solution.

Figure 4:
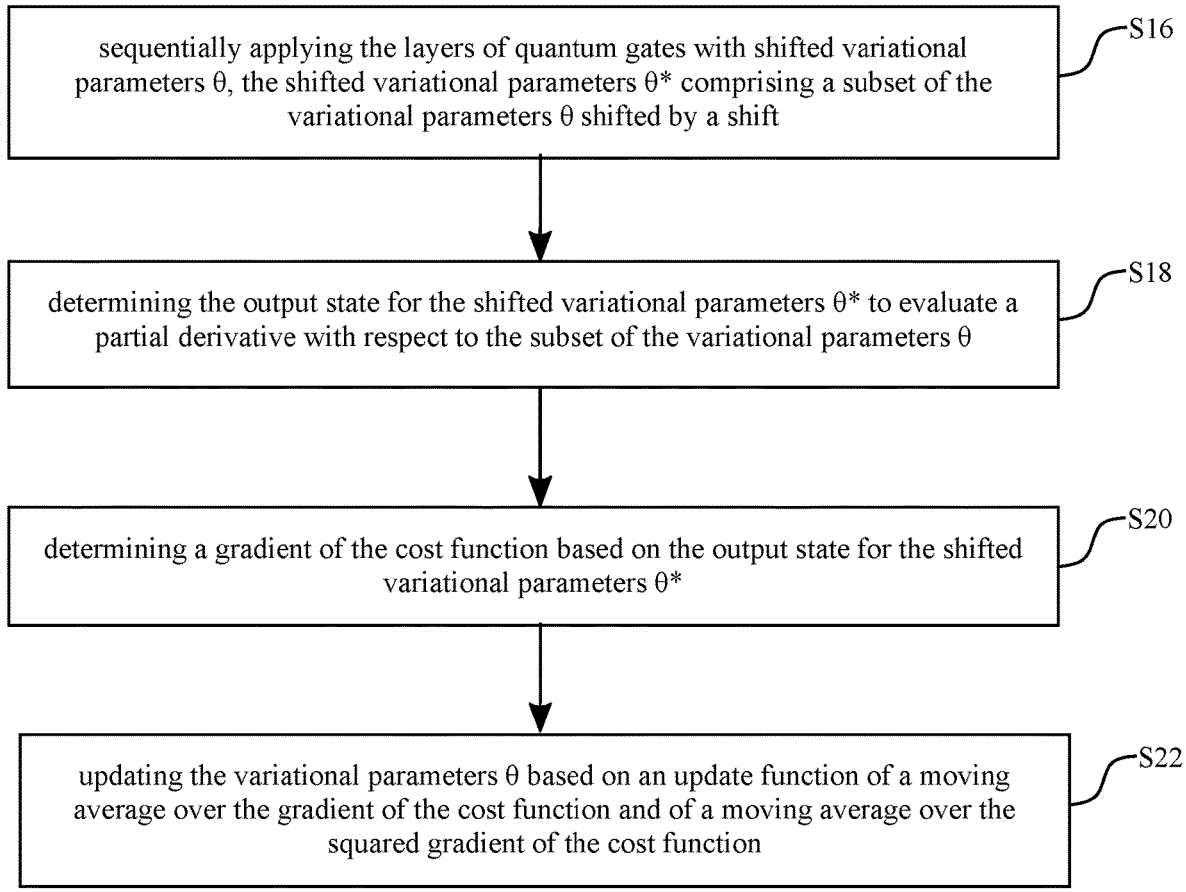
FIG. 4 illustrates an example of a flow diagram of a method for iteratively improving a solution to a computational problem with a quantum computational network.

FIG. 4 illustrates an example of a flow diagram of a method for iteratively improving a solution to a computational problem with a quantum computational network 20. The method comprises sequentially applying the layers 24a, 24b of quantum gates with shifted variational parameters $\vec{\theta}*$, the shifted variational parameters $\vec{\theta}*$ comprising a subset of the variational parameters $\vec{\theta}$ shifted by a shift (S16), and determining the output state for the shifted variational parameters $\vec{\theta}*$ to evaluate a partial derivative with respect to the subset of the variational parameters $\vec{\theta}$ (S18). The method further comprises determining a gradient of the cost function based on the output state for the shifted variational parameters $\vec{\theta}*$ (S20), and updating the variational parameters $\vec{\theta}$ based on an update function of a moving average over the gradient of the cost function and of a moving average over the squared gradient of the cost function (S22).

Specifically, for a variational gate with two eigenvalues $\pi/2$ (single qubit rotation according to Pauli generator matrix, as in the example of FIG. 2) and a variable action B0, the shift may be $\pi/2$. The partial derivative of the outcome f according to the evolution of the qubit register 12 in the quantum computational network 20 with respect to the variable action $\theta_j$ may then be determined according to according to $\partial_{\theta_j} f = \frac{1}{2}(f(\theta_j + \pi/2) - f(\theta_j - \pi/2))$.

To improve the solution weighted according to the cost function described in conjunction with FIG. 3, the gradient of the cost function based on the observable probabilities $|b_i(\vec{\theta})|^2$ can be evaluated according to $$\partial_{\theta_j} C = \sum_{i \neq k} Q_{ik} \left( \partial |b_i(\vec{\theta})|^2 |b_k(\vec{\theta})|^2 + |b_i(\vec{\theta})|^2 \partial_{\theta_j} |b_k(\vec{\theta})|^2 \right) + \sum_i^{nc} Q_{ii} \partial_{\theta_j} |b_i(\vec{\theta})|^2$$

with the partial derivative of the observable probabilities $|b_i(\vec{\theta})|^2$ of the cost function being given by:

$$\partial_{\theta_j} |b_i(\vec{\theta})|^2 = \frac{\partial_{\theta_j} \langle \psi(\vec{\theta})|(|1\rangle\langle 1| \otimes |i\rangle\langle i|)|\psi(\vec{\theta})\rangle}{|\langle \psi(\vec{\theta})|i\rangle|^2} - \frac{\langle \psi(\vec{\theta})|(|1\rangle\langle 1| \otimes |i\rangle\langle i|)|\psi(\vec{\theta})\rangle}{|\langle \psi(\vec{\theta})|i\rangle|^4} \partial_{\theta_j} (\langle \psi(\vec{\theta})||i\rangle\langle i||\psi(\vec{\theta})\rangle)$$

The partial derivatives of the variational gates with variable actions $\theta_j$ in the above equation may be determined from the measured expectation values with shifted variational parameters $\vec{\theta}^*$ according to $$\partial_{\theta_j} \langle \psi(\vec{\theta})|(|1\rangle\langle 1| \otimes \langle \rangle |i\langle \rangle|i\rangle)|\psi(\vec{\theta})\rangle = \frac{1}{2}(\langle \psi(\theta_j + \pi/2)|(|1\rangle\langle 1| \otimes |i\rangle\langle i|)|\psi(\theta_j + \pi/2)\rangle - \langle \psi(\theta_j - \pi/2)|(|1\rangle\langle 1| \otimes |i\rangle\langle i|)|\psi(\theta_j - \pi/2)\rangle)$$

and $$\partial_{\theta_j} \langle \psi(\vec{\theta})||i\rangle\langle i|\psi(\vec{\theta})\langle_j\rangle = \frac{1}{2}(\langle \psi(\theta_j + \pi/2)||i\rangle\langle i||\psi(\theta_j + \pi/2)\rangle - \langle \psi(\theta_j - \pi/2)||i\rangle\langle i||\psi(\theta_j - \pi/2)\rangle)$$

based on the expectation values of measuring a certain register state $|1\rangle \otimes |i\rangle$ and $|i\rangle$ for variational parameters $\vec{\theta}^*$ symmetrically shifted by $\pi/2$, respectively.

In other words, the gradient of the cost function may be determined based on the measured outcome of the quantum computational network 20 for shifted variational parameters $\vec{\theta}^*$, wherein the partial derivatives of the cost function are based on the probabilities of measuring the computational basis states of the register qubits for the shifted variational parameters $\vec{\theta}^*$ and measuring the conditional probabilities of measuring an ancilla state (e.g. $|1\rangle$) of the at least one ancilla qubit and the computational basis states of the register qubits for the shifted variational parameters $\vec{\theta}^*$.

The gradient may then be used to update the variational parameters $\vec{\theta}$ towards an optimized solution. However, since the measured gradient of the quantum computational network 20 determined in this way was observed to not provide stable performance, additional optimizations to the gradient may generally be required, such as an adaptive moment based update function.

The adaptive moment based update function may update the variational parameters $\vec{\theta}$ based on an update function of a moving average over the measured gradient of the cost function and of a moving average over the squared measured gradient of the cost function. In particular, the variational parameters $\vec{\theta}$ may be updated according to the function $$\vec{\theta}_{t+1} = \vec{\theta}_t - \frac{\alpha}{\sqrt{v_t} + \varepsilon} m_t$$

with $m_t$ being proportional to the moving average over the gradient of the cost function and $v_t$ being proportional to the moving average over the squared gradient of the cost function, $\alpha$ being a learning rate hyperparameter, e.g. 0.01, and $\varepsilon$ being a small number with respect to the expected magnitude of the update, e.g. $10^{-8}$.

The moving average may exponentially decay and may be determined iteratively according to $$m_t = \frac{\beta_1 m_{t-1} + (1 - \beta_1) \nabla C|_{\vec{\theta} = \vec{\theta}_t}}{1 - \beta_1^t} \text{ and}$$

$$v_t = \frac{\beta_2 v_{t-1} + (1 - \beta_2) (\nabla C|_{\vec{\theta} = \vec{\theta}_t})^2}{1 - \beta_2^t},$$

with $\nabla C|_{\vec{\theta} = \vec{\theta}_t}$ being the gradient determined at iterative step t based on the output state for the shifted variational parameters $\vec{\theta}^*$, and $(\nabla C|_{\vec{\theta} = \vec{\theta}_t})^2$ being the element square of the gradient determined at iterative step t, while $m_{t-1}$ and $v_{t-1}$ are the previously determined values of $m_t$ and $v_t$ at time step $t-1$, respectively, and $m_0$ and $v_0$ are zero.

The skilled person will appreciate that the quotients $1-\beta_1^t$ and $1-\beta_2^t$ can be understood as bias correction terms for correcting an initialization bias of the initial values of $m_t$ and $v_t$ being initialized to zero (i.e. at t=0), such that $m_t$ and $v_t$ may be exponentially decaying moving averages of the gradient/square of the gradient of the cost function, respectively, with the rate of decay being given by $\beta_1$ and $\beta_2$. For example, $\beta_1$ and $\beta_2$ may be selected as 0.9 and 0.999, respectively.

The inventors found that the adaptive moment based update function significantly improves the network performance and was superior to both simple moving averages of the gradient as well as adaptive learning rate algorithms individually.

In some embodiments, determining the updated set of variational parameters $\vec{\theta}$ based on the update function may incorporate a stochastic element, e.g. by stochastically selecting a subset of the variational parameters $\vec{\theta}$ in each iteration for determining partial derivatives and estimating the gradient based on the stochastically selected subset of the variational parameters $\vec{\theta}$ similar to a stochastic gradient descent. Accordingly, the time for updating the variational parameters $\vec{\theta}$ may be reduced as compared to a determination of the partial derivatives for all variational parameters $\vec{\theta}$.

In some embodiments, additional penalties may be added to the cost function for cost function regularization, or the magnitude of the change of the variational parameters $\vec{\theta}$ may be bounded, to incorporate additional constraints to the solution or reducing the complexity of finding an optimized solution.

By iteratively repeating the method illustrated in FIG. 4, the variational parameters $\vec{\theta}$ should be optimized towards optimized variational parameters $\vec{\theta}$, wherein the associated measured outcome of applying the quantum computational network 20 to the qubits of the qubit register 12 (the solution) features a lower (minimal) cost according to the cost function. Accordingly, the solution to a QUBO problem may be found with a quantum computational network 20 without the constraints of classical update functions, by relying on the measured gradient of the quantum computational network 20.

Figure 5:
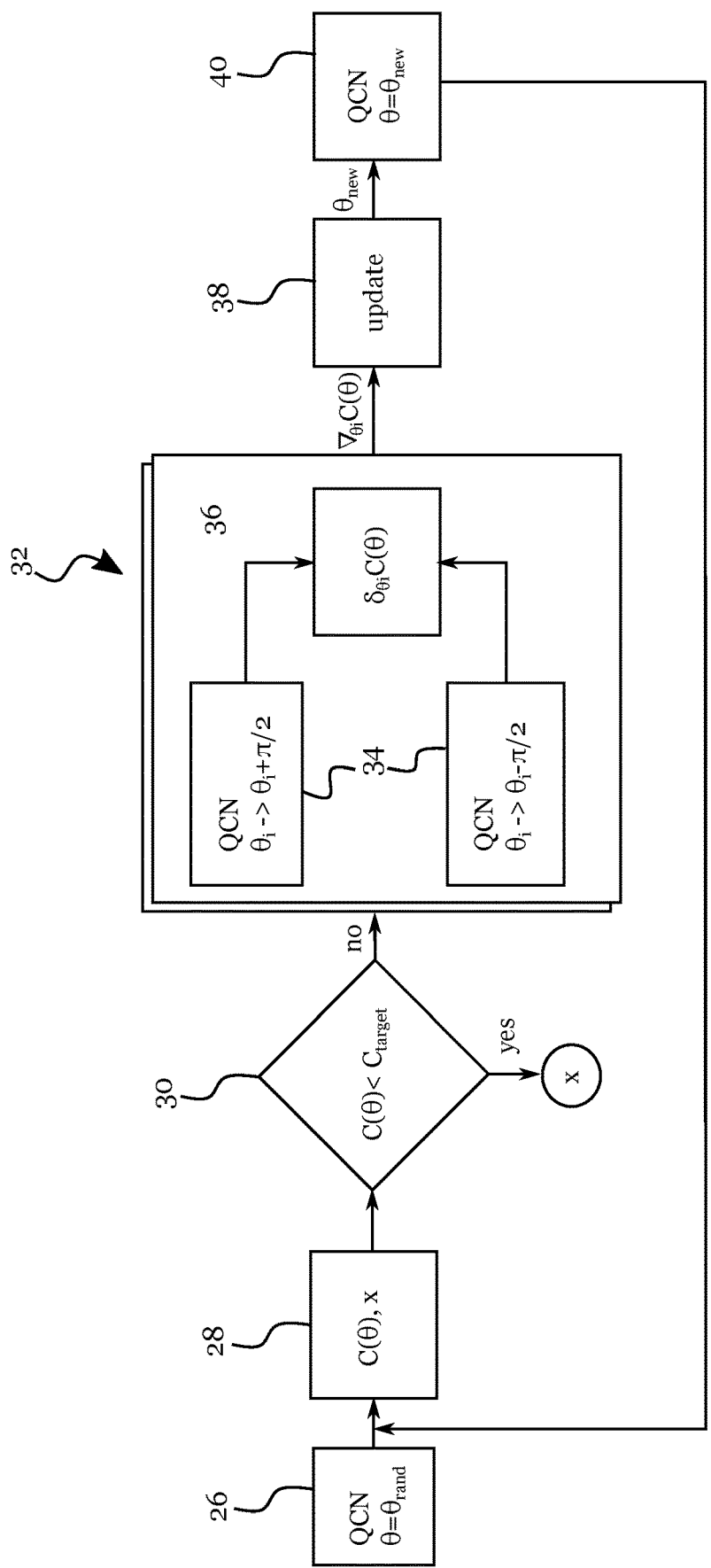
FIG. 5 illustrates a flow chart of an iterative method for improving a solution to a computational problem with a quantum computational network.

FIG. 5 illustrates a flow chart of an iterative method for improving a solution to a computational problem with a quantum computational network 20 similar to the quantum computational network 20 illustrated in FIG. 2, which may apply the methods according to FIGS. 3 and 4.

Initially, the quantum computational network 20 may be evaluated with random variational parameters $\vec{\theta}_{rand}$ in an initial quantum computational network evaluation 26 which may be running on a quantum computer. The resulting outcomes may then be analyzed by a cost function evaluation module 28 which may be running on a classical computer to determine a cost associated with the (initially random) variational parameters $\vec{\theta}$. The cost may be passed to a convergence/threshold evaluation module 30 which may be running on the same classical computer comparing the cost to a target cost $C_{target}$ or checking whether the cost/solution converges based on previous iterations. If the cost is below the threshold or has converged, the method may output the classical variables (x) corresponding to the outcome of the evaluation of the quantum computational network 20 for the variational parameters $\vec{\theta}$.

If the cost has not converged or is above the threshold, a hybrid gradient evaluation 32 may be performed. The hybrid gradient evaluation 32 comprises evaluations 34 of the quantum computational network 20 for shifted variational parameters $\vec{\theta}$ which may be running on a quantum computer, wherein the variable actions $\theta_j$ are individually shifted by symmetric shifts, and the outcomes are passed to a partial derivative evaluation module 36, which may be running on a classical computer, and which computes the partial derivatives of the cost function with respect to the respective variable action $\theta_j$. The hybrid gradient evaluation then outputs a measured gradient of the quantum computational network 20 to an update module 38, to update the variational parameters $\vec{\theta}$ based on the measured gradient of the quantum computational network 20.

The quantum computational network quantum 20 with the updated variational parameters $\vec{\theta}_{new}$ may then be evaluated in a quantum computational network evaluation 40 which may be running on a quantum computer which (quantum mechanically) determines outcomes of the quantum computational network 20 for the updated variational parameters $\vec{\theta}_{new}$. The outcome of the quantum computational network evaluation 40 may be passed to the cost function evaluation module 28 and the convergence/threshold evaluation module 30 to iteratively repeat an optimization process until the cost of the outcome converges or is below a predefined threshold.

Figure 6A:
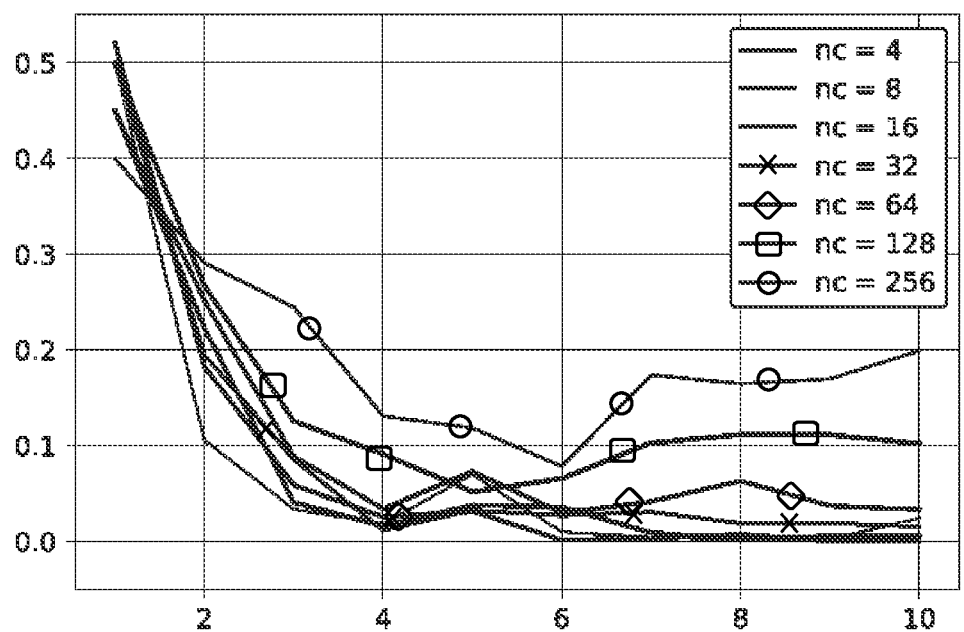
FIG. 6A, 6B illustrate two diagrams of the simulated performance of the hybrid quantum computation architecture.
Figure 6B:
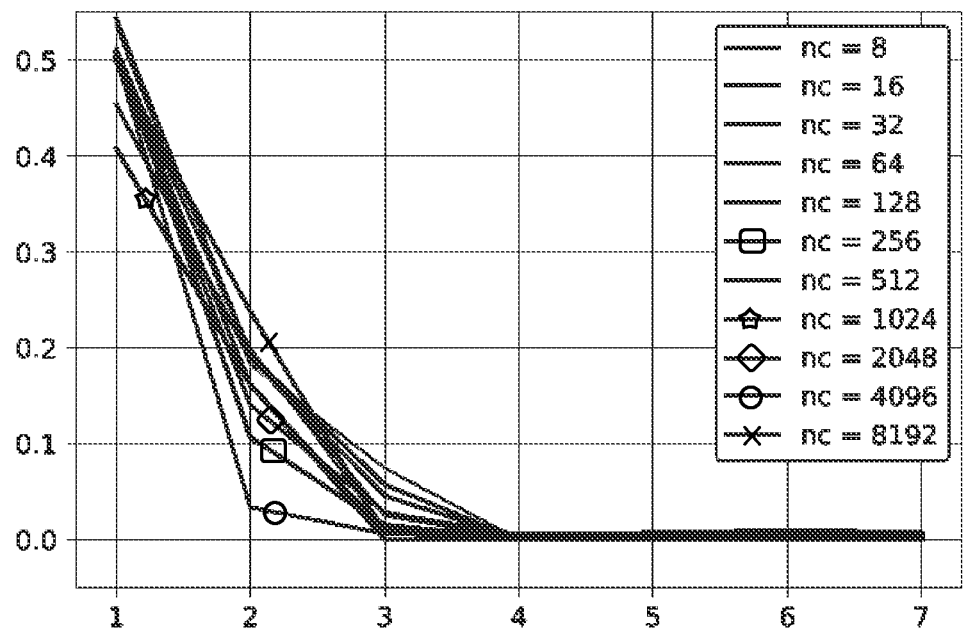

FIG. 6A, 6B illustrate two diagrams of the simulated performance of the hybrid quantum computation architecture described in conjunction with FIGS. 3-5. The diagrams plot the normalized cost of the solution as a function of the number L of layers 24a, 24b of a quantum computational network 20 identical to the example shown in FIG. 2 for a MaxCut problem on a "sun-graph" with different number of nodes/vertices (as can be seen in the legend).

The sun-graph a simple toy graph where the first node is connected with all other nodes, while there are no connections between other nodes. The sun graph has obvious solutions of x=[1, 0, . . . , 0] and x=[0, 1, . . . , 1], because the maximum cut isolates the first node and therefore cuts through all edges, but the algorithm does not know the solutions and has to start from a random guess.

FIG. 6A implements the gradient descent based on the measured gradient of the quantum computational network 20 without any further optimization, i.e. without applying the update function described above, but by updating the variational parameters according to $\vec{\theta}_{t+1} = \vec{\theta}_t - \alpha \nabla C | \vec{\theta} = \vec{\theta}_t$. Each point of the curves is the result of T=300 steps of gradient descent with a learning rate of $\alpha$=0.01 averaged over 20 random sun graphs. With increasing circuit depth, i.e. with an increasing number L of layers 24a, 24b of the quantum computational network 20, the accuracy of the solution increases, however, for larger problems the gradients may be unstable even for the simple toy graph problem.

FIG. 6B implements the gradient descent based on the measured gradient of the quantum computational network 20, but wherein the variational parameters $\vec{\theta}$ are updated according to the adaptive moment based update function described in conjunction with FIG. 4. Again, each curve is obtained with T=300 steps of gradient descent with a learning rate of $\alpha$=0.01 averaged over 20 random sun graphs. One can notice that the cost function reaches 0 for all numbers of classical variables (nodes) $n_c$ starting from L=4 layers 24a, 24b indicating that the relatively shallow quantum computational network 20 finds the exact solution. It is noted that for a problem with 8192 nodes the quantum computational network 20 comprises only 14 qubits and four layers 24a, 24b of quantum gates, while optimizing 56 parameters.

Figure 7:
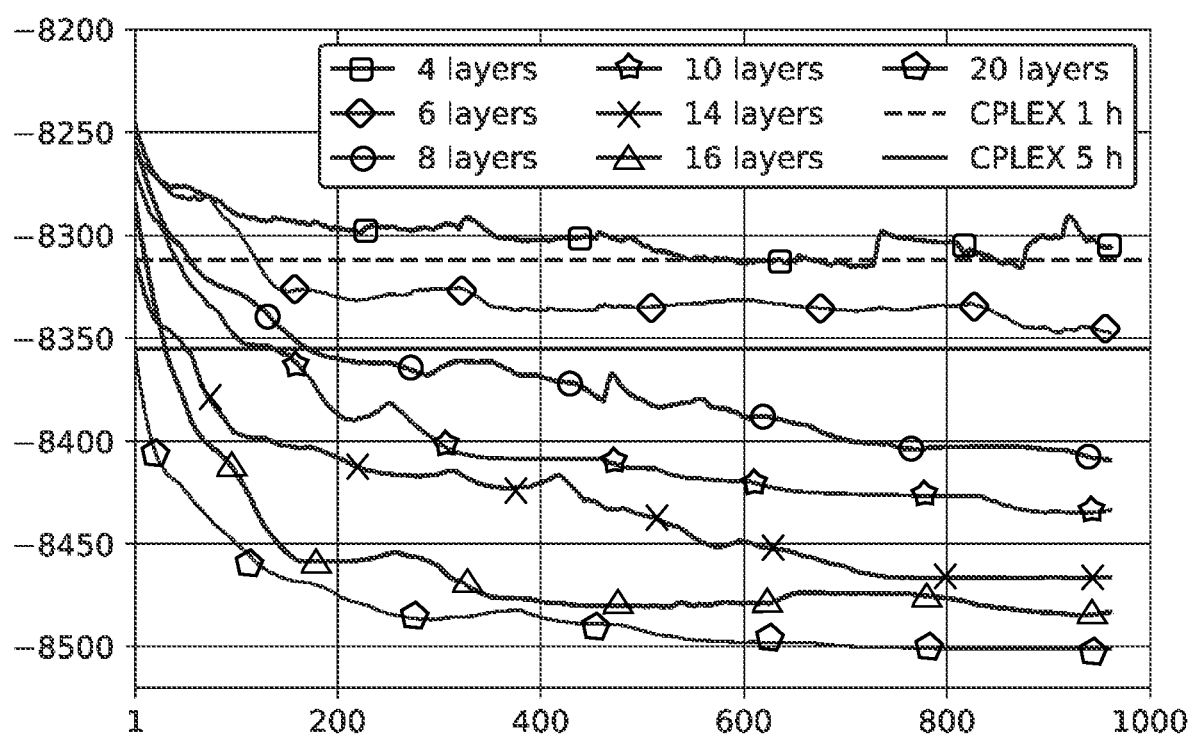
FIG. 7 illustrates a diagram of the simulated performance of the hybrid quantum computation architecture with a quantum computational network.

FIG. 7 illustrates a diagram of the simulated performance of the hybrid quantum computation architecture with a quantum computational network 20 similar to the one used in FIG. 6B. However, in FIG. 7, the quantum computational network 20 is applied to solve MaxCut problems on random complete graphs with 256 nodes and weights of edges randomly selected from the continuous range of [0.01, 1]. The energy of the solution is plotted against the number of steps of gradient descent (i.e. the number of repetitions of the iterative method illustrated in FIG. 4), and is compared to the performance of the IBM ILOG CPLEX optimization software package as a classical solver.

The CPLEX optimization software package can exactly solve the MaxCut on 32-node graphs on six Intel $i_9$ CPUs with 64 GB of RAM in a few minutes, however, the search for an exact solution can become challenging when the size of the graph is >64 nodes.

For each graph, the quantum computational network depth L is fixed (with the number of layers L given in the legend) and compared to the results obtained with the CPLEX optimization software package running on six Intel i₉ CPUs for 1 and 5 hours in order to find an approximate solution. The quantum computational network (QCN) gradient descent was performed using the "Cirq" simulator on the same processor(s). The simulation ran for about 30 minutes for simulating the action of a quantum computational network 20 with 10 layers 24a, 24b and for about 3 hours for simulating the action of a quantum computational network 20 with 20 layers 24a, 24b, for 1000 steps. It is clear from FIG. 7 that the deeper quantum circuit in principle provides a more accurate solution in a smaller number of iterations, which illustrates the general advantage of deeper quantum computational networks 20 for finding more accurate solutions.

The skilled person will appreciate that 400 steps of gradient descent in a 20-layer QCN searching the MaxCut of the 256-node graph can be performed on the simulated quantum processor in 20 minutes, while the CPLEX gives significantly worse accuracy on the same time scale. Hence, the hybrid quantum computation architecture described above is superior to classical solvers even when the quantum computational network 20 is simulated on the same classical hardware without access to the quantum hardware. Hence, the hybrid quantum computation architecture is expected to provide further advantages when running on quantum hardware.

The skilled person will also appreciate that the quantum computational network 20 has been described with variational single qubit gates with two eigenvalues for illustrative purposes. While single qubit gates often feature higher fidelity than multi-qubit gates and while it can also be advantageous to limit the number of variational quantum gates in each layer 24a, 24b to improve a convergence of the solution, in principle other types of variational quantum gates may be used.

In the more general case, the partial derivative may still be determined based on an evaluation of the quantum computational network 20 by conditionally applying the variational quantum gates and additional quantum gates $A_k$ based on the state of an ancilla qubit.

Figure 8A:
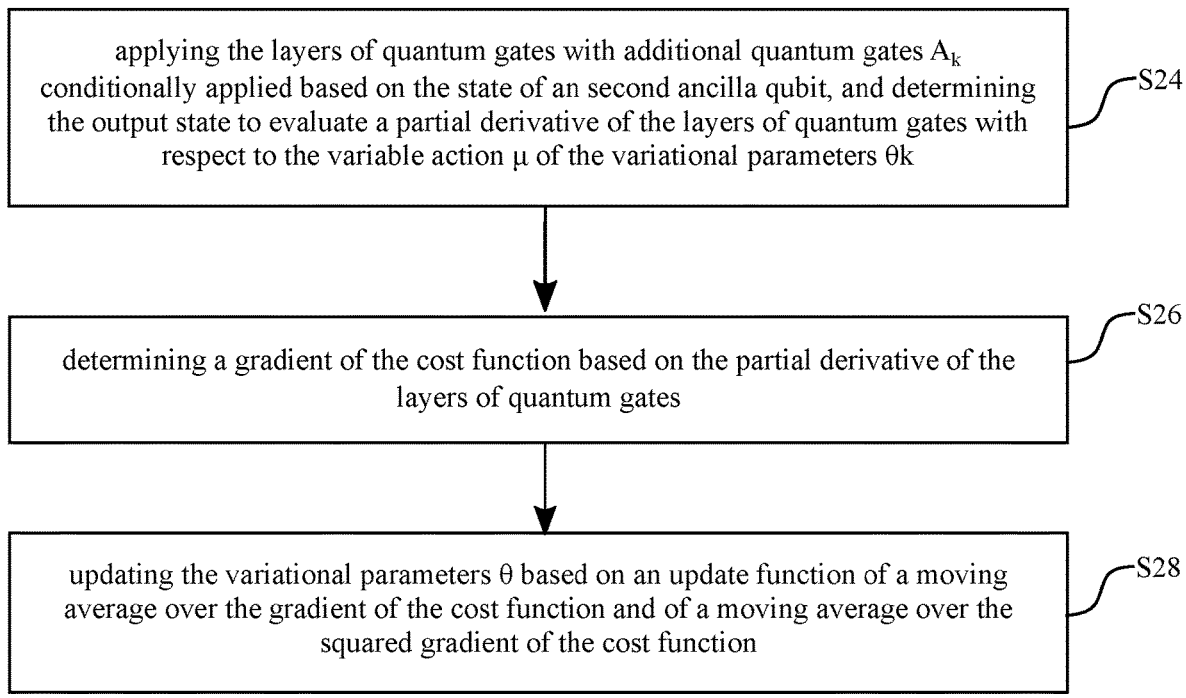
FIG. 8A, 8B illustrates another example of a flow diagram of a method for iteratively improving a solution a quantum computational network and a corresponding portion of a quantum computational architecture.

FIG. 8A illustrates another example of a flow diagram of a method for iteratively improving a solution a quantum computational network 20 for general variational quantum gates. The method comprises applying the layers 24a, 24b of quantum gates with additional quantum gates $A_k$ conditionally applied based on the state of a second ancilla qubit, and determining the output state to evaluate a partial derivative of the layers 24a, 24b of quantum gates with respect to the variable action $\theta_j$ of the variational parameters $\vec{\theta}$ (S24). The method further comprises determining a gradient of the cost function based on the partial derivative of the layers 24a, 24b of quantum gates (S26), and updating the variational parameters $\vec{\theta}$ based on an update function of a moving average over the gradient of the cost function and of a moving average over the squared gradient of the cost function (S28).

The additional quantum gates should fulfill the equation $\partial_{\theta_j} G = \Sigma_{K=1}^{K} \alpha_k A_k$, with K being a natural number (e.g. 2). The additional quantum gates $A_k$ may be applied following the conditional application of the respective variational gate conditionally on the state of the ancilla qubit, and the output state may be determined to evaluate a partial derivative of the layers of quantum gates with respect to the variable action $\theta_j$ of the variational parameters $\vec{\theta}$.

Figure 8B:
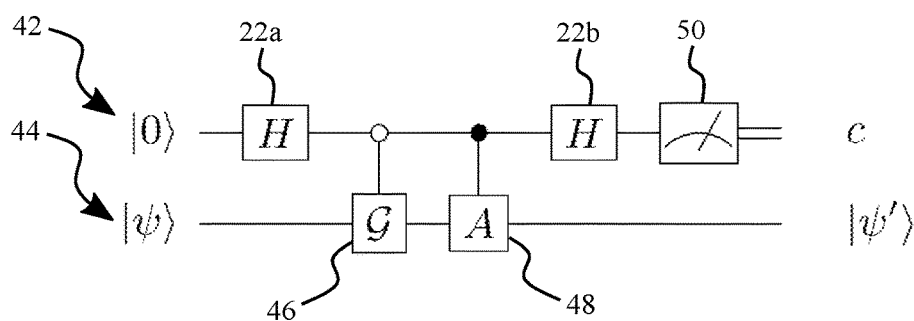

For example, as illustrated in FIG. 8B, an ancilla qubit 42 in state |0> may be prepared in a superposition state by a first Hadamard gate 22a. The state of the qubits 44 in the qubit register 12 may then be conditionally subjected to the action of the variational quantum gate 46 during the evaluation of the quantum computational network 20, e.g. conditionally on the state of the ancilla qubit 42 being |0>. Subsequently, the resulting state of the qubits 44 in the qubit register 12 may be conditionally subjected to the action of the additional quantum gate 48, e.g. conditionally on the state of the ancilla qubit 42 being 1>. A second Hadamard gate 22b may then act on the state of the ancilla qubit 42 and the state of the ancilla qubit 42 may be measured by a measurement sensor 50.

The outcome of the quantum computation and the state of the ancilla 42 may be measured to obtain the expectation values $E_0$ and $E_1$ for the state of the ancilla being |0> and |1>, respectively, with probabilities $p_0$ and $p_1$ for each of the additional quantum gates $A_k$. The partial derivative may then be determined according to $\partial_{\theta_j} f = \Sigma_{K=1}^{K} \alpha_k 2(p_0 E_0 - p_1 E_1)|_k$.

Hence, in some embodiments, the method may comprise variational quantum gates 46 with more than two eigenvalues while the solution may be optimized with an iterative method similar to the one illustrated in FIG. 8A, 8B.

The description of the preferred embodiments and the figures merely serve to illustrate the invention and the beneficial effects associated therewith, but should not be understood to imply any limitation. The scope of the invention is to be determined solely by the appended claims.

LIST OF REFERENCE SIGNS 10 system
12 qubit register
14 plurality of quantum gates
16 measurement sensors
18 controller
20 quantum computational network
22, 22a, 22b Hadamard gates
24a, 24b layers
26 initial quantum computational network evaluation
28 cost function evaluation module
30 convergence/threshold evaluation module
32 hybrid gradient evaluation
34 quantum computational network evaluations for shifted variational parameters
36 partial derivative evaluation module
38 update module
40 quantum computational network evaluation for updated variational parameters
42 ancilla qubit
44 qubit register state
46 variational quantum gate
48 additional quantum gate
50 ancilla measurement device

The invention claimed is:

1. A method of driving a quantum computational network for determining an extremal value of a cost function for solutions of a quadratic unconstrained binary optimization problem, the quantum computational network comprising a plurality of qubits, including a plurality of register qubits and at least one ancilla qubit in a qubit register, and further comprises a plurality of layers of quantum gates acting on the qubits, the method comprising:
    initializing the qubits;
    sequentially applying the layers of quantum gates to the qubits, wherein each layer comprises multi-qubit quantum gates acting on a plurality of qubits and a plurality of variational quantum gates with two eigenvalues and variable actions onto the qubits, wherein the variable actions of the variational quantum gates of the layers of quantum gates form a set of variational parameters $\vec{\theta}$; and determining an output state of the quantum computational network for obtaining a solution associated with the set of variational parameters $\vec{\theta}$, wherein each binary variable of the quadratic unconstrained binary optimization problem is associated with a computational basis state of the register qubits, and the solution is obtained by evaluating the probabilities of measuring the computational basis states corresponding to the binary variables;

and wherein the solution is iteratively improved by:

sequentially applying the layers of quantum gates with shifted variational parameters $\vec{\theta}*$, the shifted variational parameters $\vec{\theta}*$ comprising a subset of the variational parameters shifted by a shift;

determining an output state for the shifted variational parameters $\vec{\theta}*$ to evaluate a partial derivative with respect to the subset of the variational parameters $\vec{\theta}$;

determining a gradient of the cost function based on the output state for the shifted variational parameters $\vec{\theta}*$; and updating the variational parameters $\vec{\theta}$ based on an update function of a moving average over the gradient of the cost function and of a moving average over the squared gradient of the cost function.

2. The method of claim 1, wherein the layers of quantum gates comprise the same arrangement of quantum gates in each layer.

3. The method of claim 2, wherein the quantum gates in each layer comprise a plurality of multi-qubit quantum gates which together act on all qubits of the qubit register.

4. The method of claim 1, wherein each layer of quantum gates comprises a set of variational qubit gates acting on each qubit of the qubit register.

5. The method of claim 4, wherein the set of variational qubit gates is a set of variational single qubit gates.

6. The method of claim 1, wherein a number of variational qubit gates in each layer is substantially equal to a number of qubits in the qubit register.

7. The method of claim 1, wherein the computational basis state of the register qubits is a tensor product of the computational basis of a plurality of the register qubits.

8. The method of claim 7, wherein the tensor product of the computational basis of the plurality of the register qubits is a tensor product of the computational basis of all register qubits.

9. The method of claim 1, wherein the qubits of the quantum computational network are arranged into $\log(N_c)$ register qubits and a number of $N_a$ ancilla qubits for solving a quadratic unconstrained binary optimization problem with $N_c$ classical binary variables.

10. The method of claim 1, wherein the solution is obtained by evaluating conditional probabilities of measuring an ancilla state of the at least one ancilla qubit and of measuring one of the computational basis states of the register qubits corresponding to the binary variable.

11. The method of claim 1, wherein the update function is substantially proportional to the moving average over the gradient of the cost function and substantially inversely proportional to the square root of the moving average over the squared gradient of the cost function.

12. The method of claim 11, wherein the moving average over the gradient of the cost function and of a moving average over the squared gradient of the cost function are exponentially decaying moving averages.

13. The method of claim 1, wherein the update function at an iterative step t is mathematically equivalent to:

$$\vec{\theta}_{t+1} = \vec{\theta}_t - \frac{\alpha}{\sqrt{v_t} + \epsilon} m_t$$

with $m_t$ being proportional to the moving average over the gradient of the cost function and $v_t$ being proportional to the moving average over the squared gradient of the cost function, $\alpha$ being a learning rate hyperparameter, and $\epsilon$ being a small number with respect to an expected magnitude of the update.

14. The method according to claim 13, wherein $$m_t = \frac{\beta_1 m_{t-1} + (1-\beta_1)\nabla C|_{\vec{\theta}=\vec{\theta}_t}}{1-\beta_1^t} \text{ and}$$

$$v_t = \frac{\beta_2 v_{t-1} + (1-\beta_2)(\nabla C|_{\vec{\theta}=\vec{\theta}_t})^2}{1-\beta_2^t},$$

with $\beta_1$ and $\beta_2$ being real values between 0 and 1, $\nabla C|_{\vec{\theta}=\vec{\theta}_t}$ a being a gradient determined at iterative step t based on the output state for the shifted variational parameters $\vec{\theta}*$, and $(\nabla C|_{\vec{\theta}=\vec{\theta}_t})^2$ being the element square of the gradient determined at iterative step t, while $m_{t-1}$ and $v_{t-1}$ are the previously determined values at time step $t-1$ of $m_t$ and $v_t$, respectively, and $m_0$ and $v_0$ are zero.

15. The method according to claim 1, wherein the method comprises sequentially applying the layers of quantum gates with the shifted variational parameters $\vec{\theta}*$ twice for each variational gate, the shifted variational parameters $\vec{\theta}*$ comprising a subset of the variational parameters $\vec{\theta}$ shifted by symmetric shifts for each variational gate, to evaluate a partial derivative with respect to each variable action of the variational parameters $\vec{\theta}$ for determining the gradient before updating the variational parameters $\vec{\theta}$.

16. The method of claim 1, wherein the two eigenvalues of the variational quantum gates are $\pm\frac{1}{2}$ and the shift is $\pm\pi/2$.

17. A tangible, non-transitory computer-readable medium having instructions thereon, which when executed by a processing unit, causes the processing unit to implement the method according to claim 1.

18. A method of driving a quantum computational network for determining an extremal value of a cost function for solutions of a quadratic unconstrained binary optimization problem, the quantum computational network comprising a plurality of qubits and further comprises a plurality of layers of quantum gates acting on the qubits, the method comprising:

initializing the qubits;

sequentially applying the layers of quantum gates to the qubits, wherein each layer comprises multi-qubit quantum gates acting on a plurality of qubits and a plurality of variational quantum gates G with variable actions onto the qubits, wherein the variable actions $\theta_j$ of the variational quantum gates of the layers of quantum gates form a set of variational parameters $\vec{\theta}$; and determining an output state of the quantum computational network for obtaining a solution associated with the set of variational parameters $\vec{\theta}$, wherein each binary variable of the quadratic unconstrained binary optimization problem is associated with a computational basis state of the register qubits, and the solution is obtained by evaluating the conditional probabilities of measuring the computational basis states corresponding to the binary variables;

and wherein the solution is iteratively improved by:

applying the layers of quantum gates and additional quantum gates $A_k$ conditionally applied based on the state of an ancilla qubit, the additional quantum gates fulfilling the equation $\partial_{\theta_j} G = \Sigma_{k=1}^{K} \alpha_k A_k$, with K being a real positive value, $\alpha_k$ being a decomposition coefficient, and determining the output state to evaluate a partial derivative of the layers of quantum gates with respect to the variable action $\theta_j$ of the variational parameters $\vec{\theta}$;

determining a gradient of the cost function based on the partial derivative of the layers of quantum gates; and updating the variational parameters $\vec{\theta}$ based on an update function of a moving average over the gradient of the cost function and of a moving average over the squared gradient of the cost function.

19. A hybrid quantum computation system for determining an extremal value of a cost function for solutions of a quadratic unconstrained binary optimization problem, the system comprising:

a quantum computational network comprising a qubit register comprising a plurality of register qubits, a plurality of quantum gates selectively acting on the qubits of the qubit register including multi-quantum gates acting on multiple qubits of the qubit register, wherein the quantum gates comprise a plurality of variational quantum gates with respective variable actions onto the qubits of the qubit register, wherein the variable actions form a set of variational parameters $\vec{\theta}$; and a controller configured to initialize the qubits of the qubit register;

apply the quantum gates to the qubit register in a sequence of layers with the variational parameters $\vec{\theta}$, wherein each layer comprises variational quantum gates for determining an output state;

apply the sequence with shifted variational parameters $\vec{\theta}^*$, the shifted variational parameters $\vec{\theta}^*$ comprising a subset of the variational parameters $\vec{\theta}$ shifted by a shift and determine an associated output state for the shifted variational parameters $\vec{\theta}^*$ and determining an output state for the shifted variational parameters $\vec{\theta}^*$ to evaluate a partial derivative with respect to the subset of the variational parameters $\vec{\theta}$; and/or conditionally apply the layers of quantum gates and additional quantum gates $A_k$ based on the state of an ancilla qubit, the additional quantum gates fulfilling the equation $\partial_{\theta_j} G = \Sigma_{k=1}^{K} \alpha_k A_k$, with K being a real positive value, $\alpha_k$ being a decomposition coefficient, and determine the output state to evaluate a partial derivative of the layers of quantum gates with respect to the variable action $\theta_j$ of the variational parameters $\vec{\theta}$;

determine a gradient of a cost function based on the partial derivative, wherein the cost function associates a cost to a solution encoded in the output state, wherein each binary variable of the quadratic unconstrained binary optimization problem is associated with a computational basis state of the register qubits, and the solution is obtained by evaluating the conditional probabilities of measuring the computational basis states corresponding to the binary variables; and update the variational parameters $\vec{\theta}$ based on an update function of a moving average over the gradient of the cost function and of a moving average over the squared gradient of the cost function.

20. A tangible, non-transitory computer-readable medium having instructions thereon, which when executed by a processing unit, causes the processing unit to implement and/or to control the system according to claim 19.

* * * * *